(12) United States Patent
Sain et al.

(10) Patent No.: US 8,940,132 B2
(45) Date of Patent: Jan. 27, 2015

(54) MANUFACTURING PROCESS FOR HYBRID ORGANIC AND INORGANIC FIBRE-FILLED COMPOSITE MATERIALS

(76) Inventors: Mohini M. Sain, Toronto (CA); Suhara Panthapulakkal, Toronto (CA); Shiang F. Law, Toronto (CA)

( * ) Notice: Subject to any disclaimer, the term of this patent is extended or adjusted under 35 U.S.C. 154(b) by 885 days.

(21) Appl. No.: 12/442,080

(22) PCT Filed: Sep. 21, 2007

(86) PCT No.: PCT/CA2007/001683
§ 371 (c)(1),
(2), (4) Date: Mar. 19, 2009

(87) PCT Pub. No.: WO2008/034247
PCT Pub. Date: Mar. 27, 2008

(65) Prior Publication Data
US 2009/0314442 A1    Dec. 24, 2009

(30) Foreign Application Priority Data
Sep. 21, 2006  (CA) ..................................... 2560349

(51) Int. Cl.
*D21C 3/22*    (2006.01)
*B29C 70/12*   (2006.01)
(Continued)

(52) U.S. Cl.
CPC . *B29C 70/12* (2013.01); *B29B 7/92* (2013.01); *C08J 3/201* (2013.01); *C08J 5/047* (2013.01);
(Continued)

(58) Field of Classification Search
USPC ......... 264/37.28, 627, 640, 641, 913; 162/57, 162/141, 142, 157.1
See application file for complete search history.

(56) References Cited

U.S. PATENT DOCUMENTS 3,943,079 A    3/1976    Hamed
4,250,064 A    2/1981    Chandler
(Continued)

FOREIGN PATENT DOCUMENTS

CA    2527325    4/1998
CA    2235531    11/2005
(Continued)

*Primary Examiner* — Jeffrey Wollschlager
*Assistant Examiner* — Stella Yi

(57) ABSTRACT

The present invention relates to a process for the manufacture of structural hybrid thermoplastic composites where organic and inorganic fibers are well dispersed in a thermoplastic matrix. The process comprises defibrillating the organic fibers with or without the presence of surface active agents using a mixer at a high shear and at a temperature lower than the decomposition temperature of organic fibers and melting point of the surface active agents to separate the hydrogen bonded fibers and generate microfibers, followed by blending and dispersion of the organic fibers in the thermoplastic matrix to produce a fiber composite, followed by further blending and dispersion of the fiber composite with inorganic fibers at a low shear to get the moldable hybrid composite, followed by extrusion, injection or compression-injection molding. Low shear mixing maintains the inorganic fiber length. The process produces high performance composite materials having excellent performance properties and are ideally suited for automotive, aerospace, furniture, sports articles, upholstery and other structural and semi-structural applications.

16 Claims, 8 Drawing Sheets

(51) Int. Cl.
  *B29B 7/92* (2006.01)
  *C08J 3/20* (2006.01)
  *C08J 5/04* (2006.01)
  *C08J 5/06* (2006.01)
  *C08L 1/02* (2006.01)
  *C08L 23/04* (2006.01)
  *C08L 23/10* (2006.01)
  *C08L 23/12* (2006.01)
  *C08L 97/02* (2006.01)
  *C08L 101/00* (2006.01)
  *C08K 7/14* (2006.01)
  *C08L 51/06* (2006.01)

(52) U.S. Cl.
  CPC .... *C08J 5/06* (2013.01); *C08L 1/02* (2013.01); *C08L 23/04* (2013.01); *C08L 23/10* (2013.01); *C08L 23/12* (2013.01); *C08L 97/02* (2013.01); *C08L 101/00* (2013.01); C08J 2323/12 (2013.01); *C08K 7/14* (2013.01); *C08L 51/06* (2013.01); C08L 2205/16 (2013.01)
  USPC ............ 162/57; 162/9; 162/28; 162/234; 264/627; 264/640; 264/641; 264/644; 264/441; 264/37.28; 264/172.11; 264/168

(56) References Cited

U.S. PATENT DOCUMENTS

| | | | |
|---|---|---|---|
| 4,414,267 A | 11/1983 | Coran et al. | |
| 4,442,243 A | 4/1984 | Woodhams | |
| 4,468,428 A * | 8/1984 | Early et al. | 428/221 |
| 4,481,075 A * | 11/1984 | Dailly et al. | 162/145 |
| 4,559,376 A | 12/1985 | Kubat et al. | |
| 4,717,742 A | 1/1988 | Beshay | |
| 5,110,275 A | 5/1992 | Scheuring | |
| 5,120,776 A | 6/1992 | Raj et al. | |
| 5,153,241 A | 10/1992 | Beshay | |
| 5,169,941 A | 12/1992 | Mach et al. | |
| 5,185,117 A | 2/1993 | Hawley | |
| 5,288,772 A | 2/1994 | Hon | |
| 5,409,763 A | 4/1995 | Serizawa et al. | |
| 5,540,797 A | 7/1996 | Wilson | |
| 5,718,858 A | 2/1998 | Shirai et al. | |
| 5,879,602 A | 3/1999 | Scheuring | |
| 5,973,035 A | 10/1999 | Medoff et al. | |
| 5,981,631 A * | 11/1999 | Ronden et al. | 524/13 |
| 6,186,769 B1 | 2/2001 | Hawley | |
| 6,258,876 B1 | 7/2001 | Medoff et al. | |
| 6,270,883 B1 | 8/2001 | Sears et al. | |
| 6,419,864 B1 | 7/2002 | Scheuring et al. | |
| 6,482,515 B1 | 11/2002 | Berndt et al. | |
| 6,565,348 B1 | 5/2003 | Snijder et al. | |
| 6,610,232 B2 | 8/2003 | Jacobsen | |
| 6,632,863 B2 | 10/2003 | Hutchison et al. | |
| 6,780,359 B1 | 8/2004 | Zehner et al. | |
| 6,875,385 B2 | 4/2005 | Hawley | |
| 7,048,431 B2 | 5/2006 | Sieverding et al. | |
| 2005/0225009 A1 * | 10/2005 | Sain et al. | 264/328.18 |

FOREIGN PATENT DOCUMENTS

| | | |
|---|---|---|
| DE | 19711247 | 12/1997 |
| EP | 0056703 B2 | 1/1982 |
| WO | WO 0021743 | 10/1998 |
| WO | WO 03091006 | 11/2003 |

* cited by examiner

MANUFACTURING PROCESS FOR HYBRID ORGANIC AND INORGANIC FIBRE-FILLED COMPOSITE MATERIALS

PRIORITY

This application claims the benefit of Canadian Provisional Patent Application Number 2,560,349 filed on 21 Sep. 2007.

FIELD OF THE INVENTION

The present invention relates generally to organic fibre and inorganic fibre hybrid thermoplastic composites. The present invention relates more particularly to a method of producing a hybrid thermoplastic composition with improved material characteristics using organic lignocellulosic fibres as reinforcements in combination with inorganic fibres.

BACKGROUND OF THE INVENTION

Lignocellulosic fibre-filled composites are widely used in a broad spectrum of structural as well as non-structural applications including automotive, building and construction, furniture, sporting goods and the like. This is because of the advantages offered by organic fibres compared to conventional inorganic fillers, and includes:
1. plant fibres have relatively low densities compared to inorganic fillers;
2. plant fibres result in reduced wear on the processing equipment;
3. plant fibres have the advantages of health and environmental issues;
4. plant fibres are renewable resources and their availability is more or less unlimited;
5. composites reinforced by plant fibres are $CO_2$ neutral;
6. plant fibres composites are recyclable and are easy to dispose; and
7. complete biodegradable composite product can be made from plant fibres if used in combination with biopolymers.

There is extensive prior art in the field of lignocellulosic fibre reinforced composite materials. Notably, Zehner in U.S. Pat. No. 6,780,359 (2004) describes a method of manufacturing a component mixing cellulosic material with polymer, forming composite granules and molding granules into a component, utilizing a selection of thermoplastic resins, cellulose, additives, and inorganic fillers as feedstock and specifying a preference of wood flour over wood fibre in order to achieve a sufficient coating of cellulose by the plastic matrix.

Hutchison et al. in U.S. Pat. No. 6,632,863 (2003) teaches manufacturing of a pellet comprising at least 55% cellulosic fibre, blending the pellet with more polymer to form a final composition of at least 35% fibre and molding said pellet into articles.

Snijder et al. in U.S. Pat. No. 6,565,348 (2003) describes a multi-zone process involving melting the polymer, feeding the fibre continuously into the melt and kneading the mixture to produce fibres of the highest aspect ratio, and extruding the mixture and form granules.

Sears et al. in U.S. Pat. No. 6,270,883 (2001) describes use of a twin-screw extruder blending of fibre granules or pellets with the polymer and additives.

Medoff et al. in U.S. Pat. No. 6,258,876 (2001) teaches a process for manufacturing a composite comprising shearing cellulosic of lignocellulosic fibre to the extent that its internal fibres are substantially exposed to form texturized fibres, and combining them with a resin. Medoff et al. in U.S. Pat. No. 5,973,035 (1999) teaches a similar cellulosic composite.

Mechanical properties of the lignocellulosic fibre-filled polymer composites are mainly determined by the: (i) length of the fibres in the composite; (ii) dispersion of the fibres in the polymer matrix; (iii) interfacial interaction between the fibres and the polymer matrix (in conventional lignocellulosic fibre composites fibre agglomeration has been observed, which is the main constraint of developing structural materials; and (iv) the chemical nature of the fibre.

The prime challenges allied with the development of a manufacturing process for high performance structural materials from lignocellulosic and inorganic fibre-filled thermoplastic materials include retention of the fibre length which may be desirable for the effective stress transfer from the matrix to the fibre and well dispersion of fibres in the matrix to avoid stress concentrating agglomerates in addition to a good fibre matrix interfacial adhesion which enhances the stress transfer to the fibre. Lignocellulosic fibres are rich in hydroxyl groups and because of the strong hydrogen bonds between these hydroxyl groups it is extremely difficult to get a homogeneous dispersion of these fibres in the hydrophobic thermoplastic matrix. The highly hydrophilic cellulosic fibres are highly incompatible with the hydrophobic thermoplastic matrix and this also leads to poor wetting and dispersion of the fibres. Use of proper interface modifiers can improve the wetting and dispersion to a certain extent and improve the performance of the composites. Research has been done to improve dispersion and interfacial adhesion and hence to improve the properties of the lignocellulosic composites.

For example, in U.S. Pat. No. 4,250,064 (1981) Chandler describes the use of plant fibres in combination with fine or coarse inorganic filler such as $CaCO_3$ to improve the dispersion of fibres in the polymer matrix. Methods such as pre-treatment of cellulosic fibres by slurrying them in water and hydrolytic pre-treatment of cellulosic fibres with dilute HCl or $H_2SO_4$ was described by Coran et al. and Kubat et al. in U.S. Pat. No. 4,414,267 (1983) and U.S. Pat. No. 4,559,376 (1985), respectively. Pretreatment of cellulosic fibres with lubricant to improve dispersion and bonding of the fibres in the polymer matrix was disclosed by Hamed in U.S. Pat. No. 3,943,079 (1976).

Use of functionalised polymers and grafting of cellulosic fibres with silane for improving dispersion and adhesion between fibre and matrix have been disclosed by Woodhams in U.S. Pat. No. 4,442,243 (1984) and Besahay in U.S. Pat. No. 4,717,7421 (1988) respectively. Raj et. al in U.S. Pat. No. 5,120,76 (1992) teaches a process for chemical treatment of discontinuous cellulosic fibres with maleic anhydride to improve bonding and dispersability of the fibres in the polymer matrix. Beshay in U.S. Pat. No. 5,153,241 (1992) explained the use of titanium coupling agent to improve bonding and dispersion of cellulosic fibres with the polymer.

Horn disclosed, in U.S. Pat. No. 5,288,772 (1994), the use of pre-treated high moisture cellulosic materials for making composites. A hydrolytic treatment of the fibres at a temperature of 160-200 degrees Celsius using water as the softening agent has been claimed by Pott et. al in a Canadian Patent No. CA 2,235,531 (1997). Sears et. al disclosed a reinforced composite material with improved properties containing cellulosic pulp fibres dispersed in a high melting thermoplastic matrix, preferably nylon as described in U.S. Pat. No. 6,270,883 (2001) and European Patent No. 1,121,244 (2001).

Performance of a discontinuous fibre-filled composite is also dependent on fibre length. For example, longer discontinuous fibres have the capacity to withstand greater stress and hence have greater tensile properties than shorter fibres of similar nature, as larger fibres can absorb more stress prior to failure than a shorter fibre. Jacobsen disclosed in the U.S. Pat.

No. 6,610,232 (2003) the use of long discontinuous lignocellulosic fibres for thermoplastic composites.

Another technique to improve the dispersion of the lignocellulosic fibres is to use high shear during melt blending of the fibres with plastics. Since the fibres are prone to break down, the high shear results in small fibres in the resultant compound where the fibres are not effective to carry the load from the matrix. Or, in other words, due to the high shear, the fibre length goes down to less than a critical fibre length. In order to achieve a high performance material from lignocellulosic thermoplastic composites, it is therefore necessary to well disperse the fibres in the matrix while preserving the critical fibre length.

An earlier patent application of the inventors of the present invention, namely Canadian Patent application 2,527,325 filed on Nov. 18, 2005, discloses a process to obtain high performing recyclable lignocellulosic fibre-filled thermoplastic composites with improved dispersion of fibres.

Hybridization is another technique to improve the performance properties of lignocellulosic composites and makes it suitable for high strength applications where conventional glass fibre-filled materials are used. Though there is extensive prior art relating the use of inorganic hybrid fibre system, there are few references directed at the preparation and development of hybrid thermoplastic composites using lignocellulosic fibre in combination with other organic or inorganic fibres.

The mechanical properties of the organic-inorganic hybrid fibre reinforced composites are highly dependant on the fibre length and dispersion of individual fibres in the polymer matrix and the interfacial compatibility between the individual fibres and the matrix. Fibre length is more critical, as the inorganic fibres are more prone to break down compared to organic fibres which adversely prevent the exploitation of the full potential of the composite materials.

The inventors of the present invention already reported that glass fibre composites processed by similar conditions to that of lignocellulosic fibre composites showed comparatively lower properties because of the extensive fibre breakage. (See: M. Sain, S. Law, F. Suhara and A. Boullioux, *Journal of Reinforced Plastics and Composites,* 24, 121 (2005).)

An earlier patent application of the inventors of the present invention, namely United States Publication No. 20050225009 and application Ser. No. 11/005,520, filed on Dec. 6, 2004, discloses a process to obtain high performing cellulosic and glass fibre-filled thermoplastic composites with improved dispersion of the cellulosic fibres. There is a need for a process for producing glass fibre-filled thermoplastic composites that includes microfibres, thereby providing enhanced interaction between the organic and inorganic fibres thereby causing an overall increase in the strength of the composite. In addition, there is a need for a process that enables the production of said fibre-filled thermoplastic composite in a single mixing apparatus, with accompanying time and energy savings.

There is extensive prior art regarding the manufacture of long glass-filled thermoplastic composites, where the long glass fibre in the form of strands or rovings are impregnated with thermoplastic resin compositions using different processing techniques. This can be either produced in the form of pellets or used directly for further processing by any techniques such as injection, compression, compression injection, extrusion, blow molding and press molding. The general methods basically involve coating or impregnation of the glass fibre with thermoplastic resin, either by dip-coating where the fibre bundles are dipped either in a powdery thermoplastic resin which is floating in the atmosphere or suspended in a liquid state, or dipped in a thermoplastic resin in a molten state, in a manner that is well-known.

For example, U.S. Pat. No. 5,409,763 (1995) to Serizawa et al. teaches a method of making glass fibre reinforced thermoplastic where a roving of glass fibre bundles is heated and then passed through a cross head die where the molten thermoplastic resin composition is fed at a specified ratio so that the glass rovings is dipped in the molten resin in the cross head die, where after the impregnated strands coming out of the die pass through a shaping die and then to a pelletizer. The content of glass fibre and the resin can be adjusted by controlling the speed of the glass rovings and the feed rate of the molten polypropylene.

Hawley disclosed in the U.S. Pat. No. 5,169,941 (1992) and U.S. Pat. No. 5,185,117 (1993) a process of making long glass fibre thermoplastic composite pellets using multiple extruder apparatus. In this method, the melted thermoplastic resin is introduced into the compounding extruder at a point downstream of the inlet point for the reinforcing fibres, so that the fibres are mechanically worked and heated before coming into contact with heated molten thermoplastic resin, and the hot mixture from the extruder may be fed directly into preform-making equipment to produce a measured preform of desired size, weight, and shape.

Other U.S. Patents from Hawley (U.S. Pat. No. 6,186,769 (2001) and U.S. Pat. No. 6,875,385 (2005)) teach an inline compounding process where continuous strands of fibre from supply spools are entrained with pressurized, molten resin flowing through a coating device and coated with the resin. The movement of the fibre and resin through the coating die may be controlled to provide a predetermined quantity of molding material to the feed screw for an injection molding machine, or simply a plate movable to and from a compression molding machine. The fibre strands may also be cut into predetermined lengths by a cutting device positioned downstream of the coating device.

Wilson in U.S. Pat. No. 5,540,797 (1996) describes a pultrusion apparatus and process for impregnation of multiple fibre tows with a thermoplastic resin. The process comprises an impregnation vessel, having an entrance and an exit end with a control device for fibre insert and resin flow, and wherein a pulling mechanism pulls the fibre tows through melted resin contained within the impregnation vessel and into a stepped decreasing diameter passageway in the resin meter and profile die to remove excess resin and shape the impregnated fibre into a useful structure before it is cooled below the melting point of the resin by the cooling die and then cut the cooled impregnated fibre structure into the desired lengths.

Shirai et al. disclosed in U.S. Pat. No. 5,718,858 (1998) an apparatus and methods for producing long fibre-reinforced thermoplastic resin compositions by initially loosening a continuous fibre bundle by a fibre loosening device to form a moving web-like continuous fibre bundle which passes through the die and is coated with a thermoplastic resin melt extruded through a slit disposed in the die by an extruder, and the impregnated web-like continuous fibre bundle may then be shaped to form a final product.

U.S. Pat. No. 6,482,515 (2002) to Berndt et al. teaches a process for producing a colored long-fibre-reinforced polyolefin structure for molding by injection molding, extrusion, blow molding or plastic compression molding, wherein fibre bundles are passed through a flat die which has been charged with a melt made from thermoplastic composition with additives, and the immersed fibre bundles are passed through a shaping die, cooled, and cut perpendicular to their running direction to give the length of the structure.

U.S. Pat. No. 7,048,431 (2006) to Sieverding et al. describes an extruder for producing fibre-containing thermoplastics using a scale assembly having a weighing plate for determining an amount of fibre to be supplied to the extruder and a fibre feeding device comprising at least two fibre guide units so as to have a good control of the fibre feeding.

U.S. Pat. No. 5,110,275 to Scheuring teaches an extruder where the glass fibres are added in the form of a fibre strand or fibre roving in such a way that adequate wetting of the fibres with molten plastics takes place in the extruder.

U.S. Pat. No. 5,879,602 to Scheuring describes an impregnating device in which the fibre rovings to be added to the extruder are pre-impregnated with plastics and a process for making the long fibre thermoplastic composite by feeding the pre-impregnated rovings to the extruder.

European Patent No. 0 056 703 B2 to Cogswell et al. details a so-called pultrusion method where continuous fibre strands are pulled through a melt of plastics to produce a composite material.

Further, Scheuring et al. in U.S. Pat. No. 6,419,864 teaches a method of preparing long fibre reinforced thermoplastics of an average length of 10 to 50 mm using a twin screw extruder in a single manufacturing process, where the fibre rovings are fed in to the molten thermoplastic composition, and cut into long fibre sections in a fibre incorporation zone.

Few prior art references disclose producing long organic fibre reinforced thermoplastic pellets. For example, Snijder et al. in U.S. Pat. No. 6,565,348 (2003) teaches a multi-zone process involving melting the polymer, feeding the organic fibre continuously into the melt and kneading the mixture to produce fibres of the highest aspect ratio, and extruding the mixture and form granules.

WO03091006 (2003) to Breard et al. discloses a method of producing a novel material comprising organic fibre bundles that are pre-impregnated with organic resin and thereafter taking the form of spools such as a yarn or ribbon.

Moreover, German Patent No. 19711247 (1997) to Mieck et al. describes a process of preparing long organic fibre reinforced polymer pellets where the hybrid slivers of reinforcement fibres and matrix fibres were heated and compacted by twisting and forming a continuous strand.

In sum, although the prior art shows processing of thermoplastic composites containing different lignocellulosic fillers and/or inorganic fillers in combination with organic fillers, with different combinations of thermoplastics, coupling agents, and fibre treatments, they are deficient in producing high strength performance cellulosic filled thermoplastic composite materials. What is needed is high performance structural composite materials where both the organic as well as the inorganic fibres have an effective fibre length and well dispersed and bonded with the thermoplastic matrix materials. What is further needed is hybrid composite materials suitable in applications where thermal resistance is important in addition to the other performance properties.

Additional Prior art publications concerning lignocellulosic thermoplastic materials that may include inorganic fibres include:

U.S. PATENT DOCUMENTS

U.S. Pat. No. 5,288,772 issued on Feb. 22, 1994 to Hon; David N. S; U.S. Pat. No. 5,165,941 issued on Nov. 24, 1992 to Hawley; Ronald C.; and U.S. Pat. No. 4,717,742 issued on Jan. 5, 1988 to Beshay; Alphons D.

OTHER PATENT DOCUMENTS

Canadian Patent Application Number CA 2527325 filed on Nov. 18, 2005 to Mohini M. Sain; Suhara Panthapulakkal; Shiang F. Suhara,

OTHER REFERENCES

R. A. Clark and M. P. Ansell, Journal of Materials Science and Technology, 21, 269 (1986).
G. Kalaprasad, K. Joseph and S. Thomas, Journal of Composite Materials, 31, 509 (1997).
H. D. Rozman, G. S. Tay, R. N. Kumar, A. Abusamah, H. Ismail and Z. A. Mohd Ishak, European Polymer Journal, 37, 1283 (2001).
M. M. Thwe and K. Liao, Comp Part A, 33, 43 (2002).
M. S. Sreekala, J. George, M. G. Kumaran and S. Thomas, Composite Science and Technology, 62, 339 (2002).
H. Li, and M. M. Sam, Polymer Plastics Technology and Engineering, 42, 853 (2003).
S. Mishra, A. K. Mohanty, L. T. Drzal, M. Misra, S. Parija, S. K. Nayak and S. S. Tripathy, Composite Science and Technology, 63, 1377 (2003).
M. Sain, S. Law, F. Suhara and A. Boullioux, Journal of Reinforced Plastics and Composites, 24, 121 (2005).

SUMMARY OF THE INVENTION

In one aspect of the present invention, a method of producing high performance and moldable thermoplastic structural composites is provided, the composites including both organic fibres (i.e. lignocellulosic) and inorganic fibres. The method involves defibrillation of the lignocellulosic fibres by mixing at a high shear, followed by melt blending the lignocellulosic fibres with a thermoplastic to create a lignocellulosic composite, followed by dispersion of the inorganic fibres into the lignocellulosic composite at a low shear, either during extrusion/injection molding/compression injection molding or prior.

In a more particular aspect of the present invention, a method is provided by which moldable lignocellulosic fibre/inorganic fibre-filled structural and/or semi-structural polymer composite materials can be produced in connection with extrusion, injection molding or compression injection molding at a low shear into a structural and/or semi-structural composite product, where inorganic fibres are well dispersed in the organic fibre thermoplastic composites.

In accordance with present invention, the following material characteristics are generally preferably achieved, by way of example: tensile strength not less than 85 MPa; flexural strength not less than 140 MPa; bending stiffness not less than 5.5 GPa; notched impact strength of 55 J/m; and un-notched impact strength not less than 310 J/m.

The method of the present invention, in one aspect thereof, includes the following steps: lignocellulosic fibres are defibrillated in a high shear mixer (with or without the presence of interface modifiers), during a time period that is operable to achieve the separation of hydrogen-bonded lignocellulosic fibres and to generate microfibres; the lignocellulosic fibres are then dispersed in a thermoplastic by mechanical mixing, or "kneading", at a temperature that is greater than the melt temperature of the thermoplastic and less than the decomposition temperature of the lignocellulosic fibres, during a time period that is operable to achieve the dispersion or blending of the lignocellulosic fibres throughout the thermoplastic creating a lignocellulosic composite; whereafter the inorganic fibres are dispersed in the lignocellulosic composite either (i)

by melt mixing at a temperature that is greater than the melt temperature of the thermoplastic and less than the decomposition temperature of the lignocellulosic fibres, during a time period that is operable to achieve the dispersion or blending of the inorganic fibres throughout the lignocellulosic thermoplastic composite, or (ii) during the process of extrusion, injection molding or injection compression molding at a low shear and at a temperature window of about 170-210 degrees Celsius.

Prior to the defibrillation step, the lignocellulosic fibres and inorganic fibres can be selected, the particularly selection defining fibre material parameters. Based on these parameters, the lignocellulosic fibres can be processed prior to defibrillation in order to control the dimension or density of the feed, for example.

The resulting characteristics of the composite materials wherein inorganic fibres are well-dispersed, and wherein mechanical entanglement of the individual fibres and interfacial adhesion between the individual fibres and the thermoplastic yield a composite material with high strength characteristics that is well-suited for structural and semi-structural applications, including for example in the automotive, aerospace, furniture and other industries.

The thermoplastic matrix material may be a polyolefin, more preferably polypropylene, but other thermoplastic materials are useful as well, e.g., polyethylene, polystyrene, polyethylene-polypropylene copolymers, poly-vinyl chlorides, polylactides, polyhydroxybutyrates, and/or polyethyleneterephthalate.

Interface modifiers, for example, surface active agents, may be used in the composite depending on the chemical properties of the thermoplastic, e.g., maleated polypropylene with propylene used as the matrix material. Other surface active agents for use in accordance with the present invention include maleated polyethylene, maleated polystyrene, maleated polylactides, maleated hydroxybutyrates and maleated terephthalates in combination with polyethylene, polystyrene, ploylactides, polyhydroxyalkonates and polyethylene terephthalates, respectively.

The organic lignocellulosic fibres used in the present invention may be obtained from both wood sources, including softwood or hardwood, as well as non-wood fibres, often referred to as agro-pulp. The fibres may be prepared using common thermo-mechanical, chemical, mechanical, or chemi-mechanical pulp processes, in a manner that is known.

The inorganic fibres used in the present invention may be any combination of artificial or chemical fibres including examples such as carbon, boron, aramid (e.g., KEVLAR™) or, in many particular applications, glass fibres. Glass fibres used in the present invention may be glass fibres having selective surface active agents that provide better performance of the composite through better interfacial interaction between the lignocellulosic fibres and inorganic fillers, on the one hand, and the thermoplastics on the other.

As mentioned above, the process and the composite product developed by the present invention will find many structural applications, namely in the automotive, aerospace and furniture industry. In addition to the environmental and economical advantages of such composite products, the said composite products can meet the stringent requirements of the said industries including cost, weight reduction, fuel efficiency, ease of disposal, and recycling.

The present invention is advantageous in comparison to known techniques because of the ability to maximize the performance properties by attaining better aspect ratios and better dispersion of both organic and inorganic fibres in the polymer matrix and at the same time providing good compatibility between the fibres and between the fibres and the polymer matrix. Another advantage of the composite product of the invention is that they are comparable with existing glass fibre-filled composites, and use of organic fibres reduces the amount of plastics and inorganic fibres used in the composite and results for example in energy savings due to reduced quantity of polyolefin and glass fibre, for example. These two later components are much more energy intensive compared to that of organic fibre production.

BRIEF DESCRIPTION OF THE DRAWINGS

A detailed description of the preferred embodiment(s) is (are) provided herein below by way of example only and with reference to the following drawings, in which.

Figure 1:
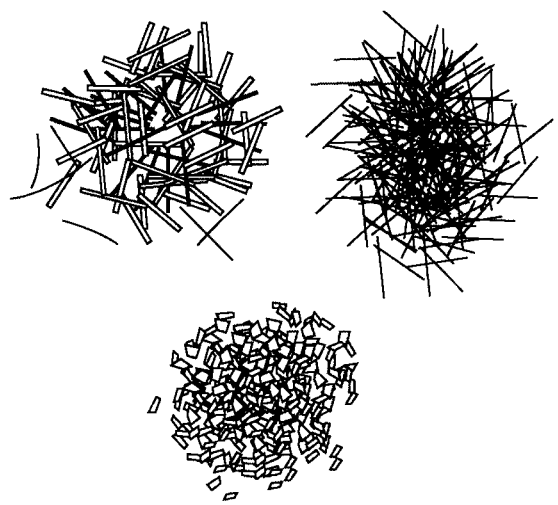
FIG. 1 illustrates different types of glass fibres.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The organic fibre/inorganic fibre hybrid composite products of the present invention containing relatively low amounts of inorganic fibres have enhanced properties, for example tensile strength not less than 90 MPa, flexural strength not less than 140 MPa, bending stiffness not less than 5.5 GPa and un-notched impact strength not less than 310 J/m, for example.

The present invention provides a method of producing high performing moldable and recyclable organic/inorganic hybrid fibre-filled thermoplastic compositions and structural composite products consisting of organic fibres and inorganic fibres, well dispersed in a matrix of thermoplastic material. The fibre/thermoplastic composite may consist of 50% or less by weight of lignocellulosic fibres (where lignocellulosic fibres have a moisture content of less than 10% by weight, and preferably less than 2% by weight) and inorganic fibres anywhere between 5% and 40% by weight, and preferably up to 60% thermoplastic by weight. Depending on the chemical composition of the thermoplastic used, an interface modifier, e.g., surface active agent, may be included to improve the interaction between the organic and inorganic fibres with the matrix and to assist with dispersing the organic and inorganic fibres throughout the matrix.

It should be understood that, depending on the chemical composition of the plastics, their surface properties and their ability to bond with lignocellulosic or any other fibre could vary. For example, polyolefin plastics, such as polyethylene and polypropylene, are generally hydrophobic and therefore may need a surface active agent or interface modifier to enhance the bonding between the plastic and fibre phase, and such agents also help to disperse the fibre in the plastic matrix. In another example, polystyrene-based organic fibre composites may not require a surface active agent or interface modifier. In this case, the organic fibre generally forms good bonding with the polystyrene during processing, and a good physical mixing ensures a good dispersion of the fibres in the polystyrene.

The defibrillation of the lignocellulosic fibres may be achieved in a high shear thermokinetic mixer to separate hydrogen bonds and generate microfibres on the surface of the individual lignocellulosic fibres. The generation of microfibres increases the surface area of the fibres and causes mechanical entanglement and furthers the eventual interfacial adhesion between the fibres and the thermoplastic matrix and also enhances the interaction between the organic and inorganic fibres, causing an overall increase in the strength of the composite. The time and temperature which may be desirable for the generation of microfibres in a high shear mixer is selected in a manner that is known.

"Microfibres", as the term is used in this disclosure, means fibrils which develop on the surface of the individual lignocellulosic fibre, and which either remain attached to the surface of the fibre or are partially or fully separated during high shear mixing. The microfibres typically have a smaller diameter relative to diameter of the fibres prior to defibrillation. The generation of microfibres increases the surface area of the fibres and causes mechanical entanglement and furthers the eventual interfacial adhesion between the fibres and the thermoplastic matrix and the fibres themselves, resulting in the production of an interpenetrating network structure and thereby causing an overall increase in the strength of the composite. Further, the strength of the fibre is enhanced by the formation of microfibres because the number of fibre defects decreases as the fibre diameter decreases.

After defibrillation in the high shear thermokinetic mixer, the fibres are melt blended, or "kneaded", with the matrix preferably by mechanical mixing achieved in the same high shear thermo-kinetic mixer in situ. The melt blending time depends on the temperature of the mixer and the shear generated inside the mixer, as the blending or kneading stops at the upper set temperature. For example, if the initial temperature of the mixer is lower, then the time which may be desirable to reach the set temperature may be greater, compared to a higher initial mixing temperature. The total time for the in situ generation of microfibres and in situ blending with the polymer may vary anywhere from around 1 minute to 4 minutes, depending on the conditions used.

The sequence of the addition of fibres, thermoplastic and additives during the melt blending process is significant. Typically, the organic fibres are added and defibrillated for a minimum residence time to provide adequate microfibre generation and dispersion of fibres. During this time, the temperature in the mixing zone generally rises. Once an adequate residence time has been achieved, the polymers and additives (if applicable) may be added. These parameters are well known to those skilled in the art.

Compositions of organic fibre and plastic after the melt blending process (e.g., in the form of pellets, granulates, or "lumps") are further processed at a low shear by dispersing and blending with inorganic glass fibres. The mixing and dispersion of inorganic fibres in the lignocellulosic composites is achieved at a temperature less than the decomposition temperature of the fibres, preferably at a temperature range of 170-210 degrees Celsius. The important factors in the blending and the dispersion of inorganic fibre are the shear and residence time. The higher the shear and the residence time during the dispersion stage means better dispersion but at the same time there may be a decrease in the inorganic fibre length. The present invention involves maximizing dispersion of inorganic fibre and retaining the fibre length which may be desirable to have better mechanical properties while ensuring that the shear and time does not produce extensive inorganic fibre breakage.

Also, it is important that the temperature over time does not attain the decomposition temperature of the lignocellulosic fibre. While the decomposition temperature provides the upper limit of temperature within a mixer, in accordance with the present invention 220 degrees Celsius is defined generally as an appropriate upper limit as many fibres begin discoloration (or "burnout") at this temperature, which generally means that the decomposition temperature is not far behind. Therefore, 220 degrees Celsius, as an example, in many applications may be defined as the upper temperature limit for dispersion of inorganic fibres in the lignocellulosic composites, depending on the exact parameters of the fibres used.

Figure 4:
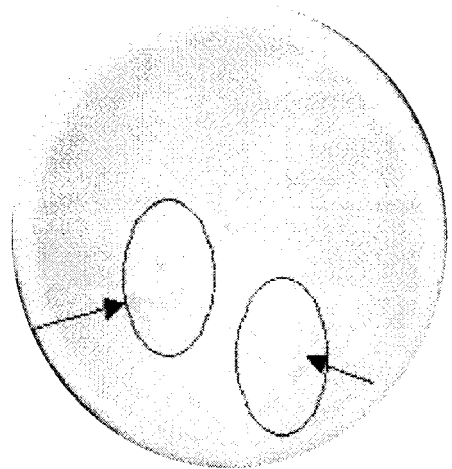
FIG. 4 illustrates plastic and organic fibres after burnout; the presence of fibre bundles, long fibres and short fibres indicates poor dispersion.
Figure 5:
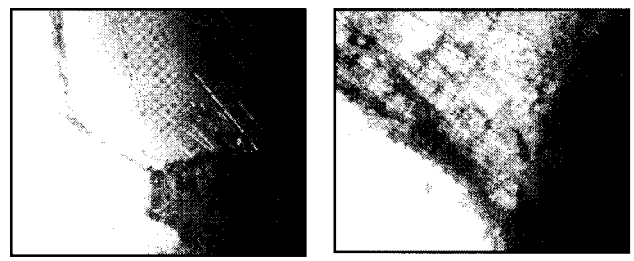
FIG. 5 illustrates fracture surface of a hybrid composite with poor dispersion, indicated by the fibre clusters.
Figure 6:
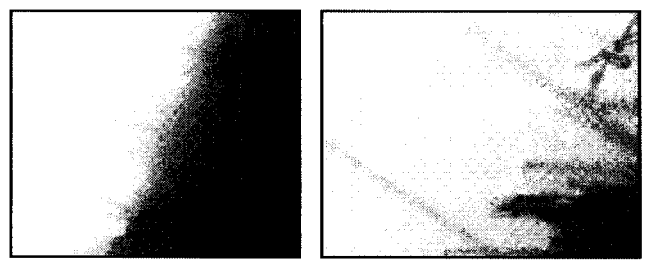
FIG. 6 illustrates fracture surface of a hybrid composite with better dispersion.
Figure 7:
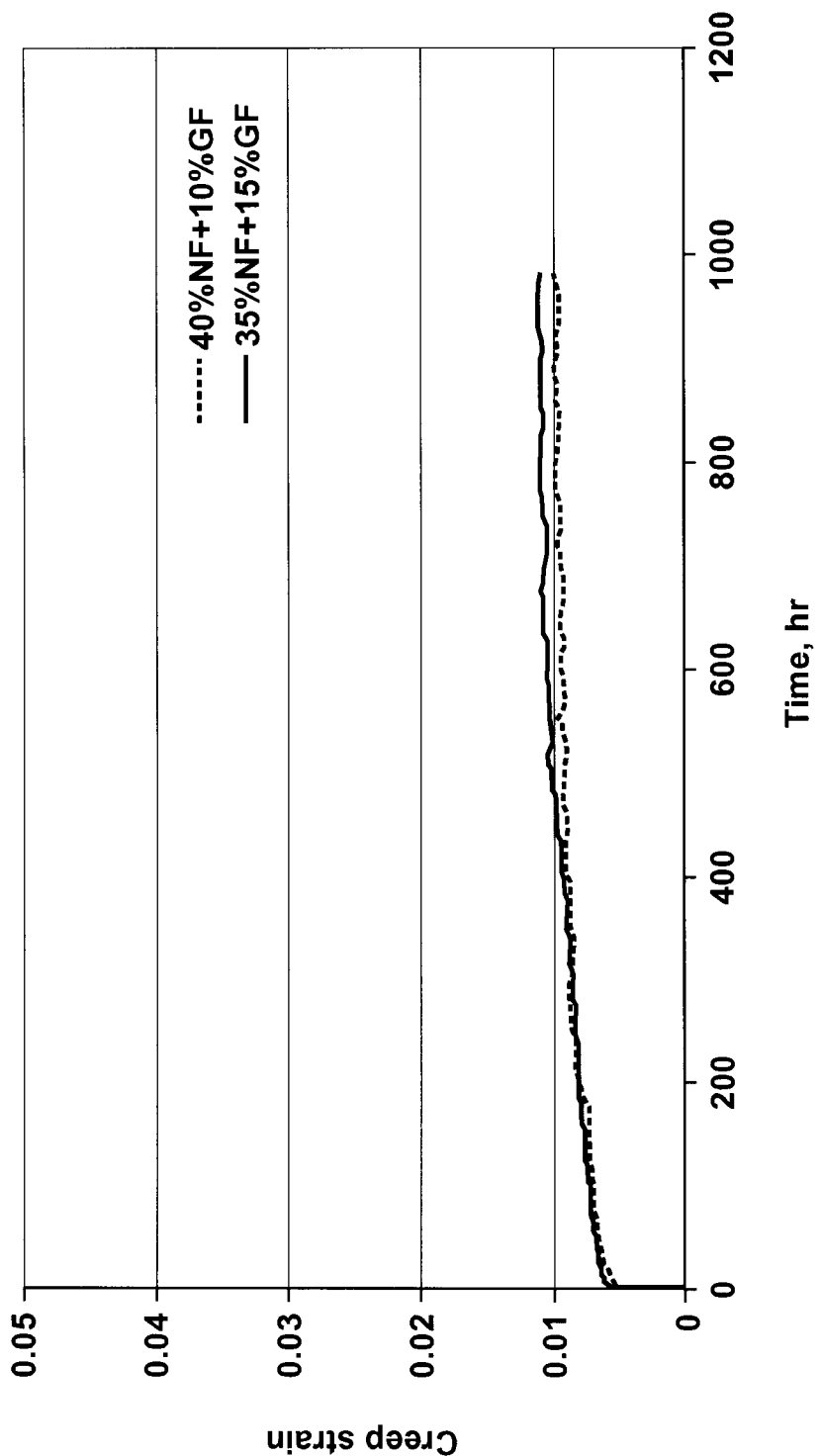
FIG. 7 illustrates creep curves of a hybrid composite.

FIG. 4 depicts some plastic and organic fibres after "burnout". The presence of fibre bundles, long fibres and short fibres indicate poor dispersion. FIG. 5 shows fracture surface of a hybrid composite also with poor dispersion, indicated by the fibre clusters. FIG. 6 shows fracture surface of a hybrid composite with better dispersion.

The time which may be desirable for the mixing and blending of inorganic fibre depends on the temperature of the mixer and the shear generated inside the mixer. The shear generated inside the mixer may depend on for example the volume of the mixing chamber, the fibre volume, and screw speed. For example, the time which may be desirable for the mixing and blending of glass fibres with the lignocellulosic fibre thermoplastic composites, at an rpm of less than or equal to 60, is less than 90 seconds depending on the temperature and fibre volume. This low shear mixing stage can be achieved in a subsequent mixing process after melt-mixing of organic fibre and plastics in a high shear mixer. For low shear mixing, extruders may be used (for example), where organic fibres, e.g., glass, are directly added to the extruder either in short fibre length or as a continuous filament.

In an aspect of the present invention, glass fibres are dispersed in the lignocellulosic fibre thermoplastic composite compositions after the melt blending process (in the form of lumps or granulates or pellets) during an injection or injection compression molding process at low shear and at a temperature less than the decomposition temperature of the fibres, preferably at a temperature range of 170-210 degrees Celsius of the melt.

The method of the present invention according to which the structural thermoplastic composites including lignocellulosic fibre and inorganic fibre are produced in a continuous process provides important cost advantages, and an unexpected improvement over what is disclosed in the prior art. The continuous process, for clarification, consists of introducing the inorganic fibre directly into the extruder, injection molding, or injection compression molding apparatus, so as to present a continuous production method of the structural thermoplastic composites.

As stated, the improved performance in the present invention is a combined effect of physical and physical/chemical entanglement developed by the microfibre structure of lignocellulosic fibres, entanglement and compatibility of glass fibres with the defibrillated lignocellulosic fibres, retention of critical fibre length of both fibres, and the interfacial adhesion formed between the fibres and the thermoplastic matrix, in the presence of one or more functional additives such as surface active agents as described herein.

The organic fibre and plastic melt-mixed lumps resulting from the high shear mixing may be used for subsequent processing steps without further granulation or pelletization.

Suitable lignocellulosic fibres may be pulp manufactured by mechanical refining, chemical pulping or a combination of both and present in an amount less than 50% by weight of the entire composition of the composite, and more preferably in an amount less than or equal to 40% by weight. Known chemical pulp manufacturing processes include high temperature caustic soda treatment, alkaline pulping (kraft cooking process), and sodium sulfite treatment. Suitable fibres include commercially available unbleached thermo-mechanical pulp (TMP), bleached thermo-mechanical pulp, unbleached chemithermomechanical pulp (CTMP), bleached chemithermomechanical fibre (BCTMP), kraft pulp and bleached kraft pulp (BKP). The fibres may be selected from any virgin or waste pulp or recycled fibres from hardwood, softwood or agro-pulp. Hardwood pulp is selected from hardwood species, typically aspen, maple, eucalyptus, birch, beech, oak, poplar or a suitable combination. Softwood pulp is selected from softwood species, typically spruce, fir, pine or a suitable combination. Agro-pulp includes any type of refined bast fibres such as hemp, flax, kenaf, corn, canola, wheat straw, and soy, jute or leaf fibres such as sisal. Alternatively, the fibre pulp selection may include a suitable combination of hardwood and softwood or a combination of wood pulp and agro-pulp.

The initial moisture content of the pulp fibre may influence the processing and performance properties of composite. A moisture content of below 10% w/w is preferred. More specifically, the pulp moisture content that is below 2% w/w is preferred.

Depending on the nature of wood species, the performance of the composite of the present invention may vary significantly. For example, a hardwood species, such as birch in the brightness range of above 60 ISO % (according to Tappi standard), may provide improved mechanical performance compared to that of maple, for example. Similarly, agro-pulp, and other fibres that are easy to defibrillate tend to give relatively superior mechanical performance. For example, chemical and mechanical pulps made from hemp and flax may provide improved performance compared to that of corn or wheat stalk pulp based composites. These varying characteristics of pulp fibres and their selection for applications dependent on such characteristics are well known to those skilled in the art.

Specific organic fibre characteristics in accordance with the present invention include the following. The average lengths of the organic fibres are generally about 0.2 to 3.5 mm, with the average diameter of organic fibre ranging between about 0.005 mm to about 0.070 mm. It should be understood that this depends on the average diameter of the fibre before defibrillation. The organic fibres generally have a brightness value between 20 and 97 ISO (according to TAPPI Standard), and typically between 60 to 85 ISO. Another characteristic of the organic fibres that may be important, depending on the specific parameters of the application, is fibre compactness and bulk density. Organic fibres are fed in the form of loosely held agglomerates having density (including air) of about 200 kg per cubic centimeter (0.2 gram per cubic centimeter) or more and freeness not below 40 CSF (CSF means Canadian Standard Freeness and is described in the prior art). The fibres may have a reciprocal bulk density between about 0.6 to 3.8 cubic centimeters per gram, and typically between 0.7 to 3.0 cubic centimeters per gram. The average fibre length as relates to "pulp freeness", may require control. The freeness of fibres are generally in the range of about 50 to 600 CSF (TAPPI standard), and typically between 100 to 450 CSF. In addition, fibres are typically not 100% lignin free and they may typically contain 0.01% to 30% (w/w) lignin.

Although brightness of the pulp may be varied depending on the performance requirement, a brightness range above 40 ISO (Tappi Standard) may be preferred in some specific applications of the present invention. A pulp bleached or brightened with oxidizing and/or reducing chemicals may influence the overall mechanical performance, dispersion of the fibres and the microfibre formation. In general, the higher the brightness, the higher the microfibre formation in a thermokinetic mixer. A brightness range above 60 ISO is particularly suitable for efficient generation of microfibres.

Inorganic fibres used in the present invention may comprise any kind of artificial or chemical fibres such as glass, carbon, boron or aramid (e.g., KEVLAR™). Preferably, the inorganic fibres used in accordance with the present invention are glass fibres and are present in a range of 5% to 30% by weight (of the hybrid composite material), preferably not greater than 20% by weight, and more preferably not greater than 15% by weight.

Dispersion of glass fibres in the lignocellulosic organic fibre thermoplastic composite, and hence performance of the composite of the present invention, may depend significantly on the nature of glass fibre, size, surface properties and nature of agglomeration before introducing it to the composite granulates or pellets. For example, glass fibres that are easy to separate from the fibre bundles (the starting state of commercial glass fibre), disperse easily compared to the glass fibres with strong fibre bundles, where it forms agglomerates or are more 'fluffy'. Fibres with specific surface sizing agents may be preferred was they generally enable easy dispersion of the glass fibres in the organic fibre thermoplastic composites.

Figure 2:
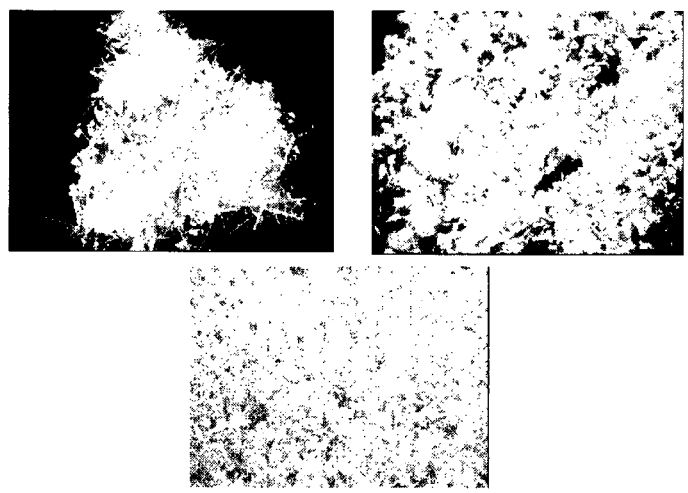
FIG. 2 illustrates different forms of glass fibre after physical mixing.
Figure 3:
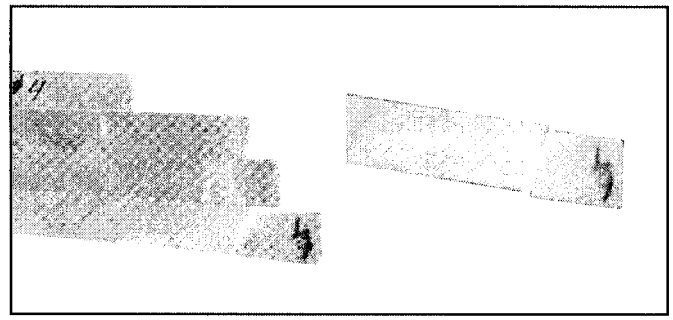
FIG. 3 illustrates fracture surfaces of cut samples; glass fibre bundles indicates poor dispersion.

Some different types of glass fibres are illustrated in FIG. 1. After physical mixing, the glass fibres appear very different, with breakage evident (FIG. 2). FIG. 3 depicts the fracture surfaces of cut samples. Glass fibre bundles indicate poor dispersion.

The matrix material used in the present invention may include a polymeric thermoplastic material with a melting point preferably of 250 degrees Celsius or less. Suitable polymeric materials include polyolefins, and preferably polpropylene, polyethylene, copolymers of propylene with other monomers including ethylene, alkyl or aryl anhydride, acrylate and ethylene homo or copolymer or a combination of these and the most preferred general purpose injection mold or extrusion grade polypropylene. Still further materials include polystyrene, polyvinyl chloride, nylon, polylactides, and polyethyleneterephthalate. For example, polypropylene with a density of 0.90 g/cm$^3$ is well-suited for use with the present invention.

The interface modifiers, e.g., surface active agents, that may be used in the present invention depending on the chemical composition of the thermoplastic preferably may include functional polymers, preferably maleic anhydride grafted polyolefins, terpolymers of propylene, ethylene, alkyl or aryl anhydrides and alkyl or aryl acrylates, and more preferably maleated polypropylene, acrylated-maleated polypropylene or maleated polyethylene, their acrylate terpolymers or a suitable combination for use with polypropylene and polyethylene matrix materials. Other useful coupling agents include maleated polystyrene and maleated polylactide in combination with polystyrene and polylactide matrix materials. Preferably, the surface active agent(s) is/are present in an amount greater than 2% by weight and less than 15% by weight of the entire composition of the composite, and more preferably in an amount less than or equal to 10% by weight.

According to one particular example of the present invention, discontinuous cellulosic pulp fibres are defibrillated for not more than 1 minute in a high shear mixer and melt blended to disperse the fibres with thermoplastic material in the presence of surface active agents (if applicable) in a high shear thermokinetic mixer, whereafter the blend is further consolidated in a low shear internal mixer at temperature less than 200 degrees Celsius and at an RPM not greater than 80, and for not more than 4 minutes, and blended with synthetic fibres at a later stage at an RPM of not greater than 40 for at least one minute.

It should be understood that the glass fibre length in the hybrid composite highly depends on the conditions of the blending process. Shear rate and residence time of various blending process may affect the fibre length and dispersion of the fibre in the composite. For example, in a melt blender such as a twin screw or single screw extruder, the shear is higher compared to a low shear internal mixer or physical mixer, and hence glass fibre length is significantly decreased when the hybrid composite is prepared using an extruder compared to the other processes described, and this in turn leads to poor performance properties, especially impact strength.

Another aspect of the present invention relates to a method of making extruded, injection molded or compression injection molded hybrid thermoplastic composite products where the inorganic fibres are melt blended and dispersed in the organic fibre thermoplastic composite granulates or pellets during the molding process. Preferably, the method includes injection molding, or injection-compression molding of the in situ blend of for example pre-dried lignocellulosic fibre thermoplastic composite granulates or pellets and glass fibre. This is carried out where, for example, the compression ratio of the screw is between 1:1 and 3:1 and the back pressure in the mixing and injection molding process is as low as possible, preferably below 25 psi. Further, to generate low shear during the injection molding, the screw of the injection molder should be configured such that the compression ratio of the mixing zone should not exceed 2.5:1 and the length to diameter ratio (L/D) should not exceed 40:1, for example.

Another aspect of the present invention relates to the fact that the introduction of inorganic fibre in a melt blended organic fibre and plastic pellets or granulates during injection, and injection compression molding process needs a careful control of the temperature from the feed zone to the mold section. Recommended temperatures for melt mixing glass fibre with organic fibre thermoplastic composite are between 170-210 degrees Celsius, more specifically between 190-200 degrees Celsius. A temperature above 200 degrees Celsius may result in undesirable discoloration and degradation of organic fibre component thereby loss of strength and performance of the material.

Another aspect in the manufacture of the organic fibre and inorganic fibre hybrid thermoplastic composites is the moisture content of the organic fibre composite pellets or granulates before the injection molding process. For example, an organic fibre and plastic composite with more than 1% by weight moisture leads to thermal degradation and discoloration of the molded product compared to pellets with 0.5% by weight of moisture. Hence, composite pellets with less than 0.5% by weight of moisture are more stable to discoloration and can process in a wider temperature operating conditions, say 170-210 degrees Celsius. The degradation and discoloration of the molded product also depends on the residence time of the composite inside the injection molder. A compromise between the flow behaviour and the minimum residence time may be desirable to obtain minimum discoloration and degradation to the composite product. Typically a residence time less of than 1 minute from the feed zone to the molded parts may be desirable to achieve high performance of the injection-molded product.

Shear forces during the melt blending of glass fibre (continuous or short) with organic fibre thermoplastic composite pellets or granulates may be important in order to obtain proper dispersion of the glass fibres in the composite matrix. For example, a low shear (low screw speed) with a screw diameter of 0.984" and with a compression ratio of 1:1 or 2:1 leads to good dispersion of selectively sized glass fibres. However, an increase in the screw speed or shear under the same conditions may lead to discoloration and degradation of the melt blend as well as in the reduction of the glass fibre length in the final product. On the other hand, a very low screw speed may lead to improper dispersion of glass fibre without fibre breakage. Both of these extreme processing conditions may lead to undesirable composite performance.

Another aspect of the present invention relates to a method of making injection or compression or compression injection molded composite products from the granulates or pellets of the hybrid fibre and thermoplastic composite of the present invention, or using them as is without forming any granulates or pellets as they comes out in the forms of lumps from the high speed mixer. Preferably, the method includes injection molding of the pre-dried granulates or pellets by removing moisture by drying to below 5% by weight. In a process of injection compression molding, a minimum pressure may be desirable. This minimum injection pressure may depend on the part size, mold design, gate opening and other mold design parameters. In accordance with the present invention, dispersion of the fibre in the polymer matrix may be further improved by increasing the injection pressure.

The present invention is distinguishable from the prior art relating to the process of manufacture of long glass fibre reinforced thermoplastic composites and long organic fibre reinforced thermoplastic composites, where the fibres are mixed with only thermoplastics. The present invention teaches a method to incorporate long glass fibres with a composite material comprising organic fibre and thermoplastic materials in a cost effective manner. The surface energy, flow properties, and morphology of the hybrid composite are different to that of composites including glass and thermoplastics alone.

In accordance with one application of the present invention, organic fibres undergo defibrillation, and glass fibre is introduced into the already compounded organic fibre in the following two alternative processes.

First, glass fibres are dispersed into the defibrillated organic fibre plastic composite granules or pellets physically without blending under a controlled low shear (to prevent the glass fibre breakage and to avoid undesired fluffing of the glass fibre). This low shear mixing may be carried out in a blender with variable speed. This mixer controls the shear rate and provides good dispersion of the glass fibre in dry form in a short time period. One measure of a good blending process is effective separation of individual fibre from fibre bundles and their uniform dispersion in the organic fibre plastic compound without undesired fibre breakage.

Second, glass fibre is introduced in a continuous form in a molten organic fibre plastic phase using a single or twin screw extruder with a low shear rate. In this regard, the present invention includes introducing glass fibres and dispersing them in an organic fibre plastics matrix by optimizing (a) the surface properties of glass to make them compatible to organic fibre plastics compound in molten phase, and (b) the melt-viscosity of the molten organic fibre and glass fibre hybrid melt by controlling the melt temperature in the extruder so that the melting of the organic fibre plastics matrix is generally completed before low shear mixing of the continuously drawn glass fibre or the short glass fibre being carried out in the mixing zone of the screw. The screw design is controlled to give a generally low compression, preferably below 2.5:1. A lower compression (e.g., 2:1) or no compression screw could provide improved results. The length to diameter ratio of the screw also plays a significant role in maintaining low shear during the melt mixing of glass fibre and organic fibre plastics. In general, a length to diameter ratio of the screw is below 50:1, preferably below 40:1. Higher compression and higher length to diameter ratios lead to undesired fibre breakage and the resulting performance of the composite is poor.

When glass fibre is introduced in a continuous form in a molten organic fibre plastics melt, the well dispersed hybrid melt from the extruder die may directly provide a desired shape or it can be directly injected in a mold to provide the desired shape. Such processes are known as in situ injection, injection compression and extrusion followed by melt dispersion. No pelletization is needed in this case. Therefore, this process comprises a single step to manufacture a profile or any complex shape by injection, extrusion, injection compression or other similar molding process such as blow molding.

Figure 8:
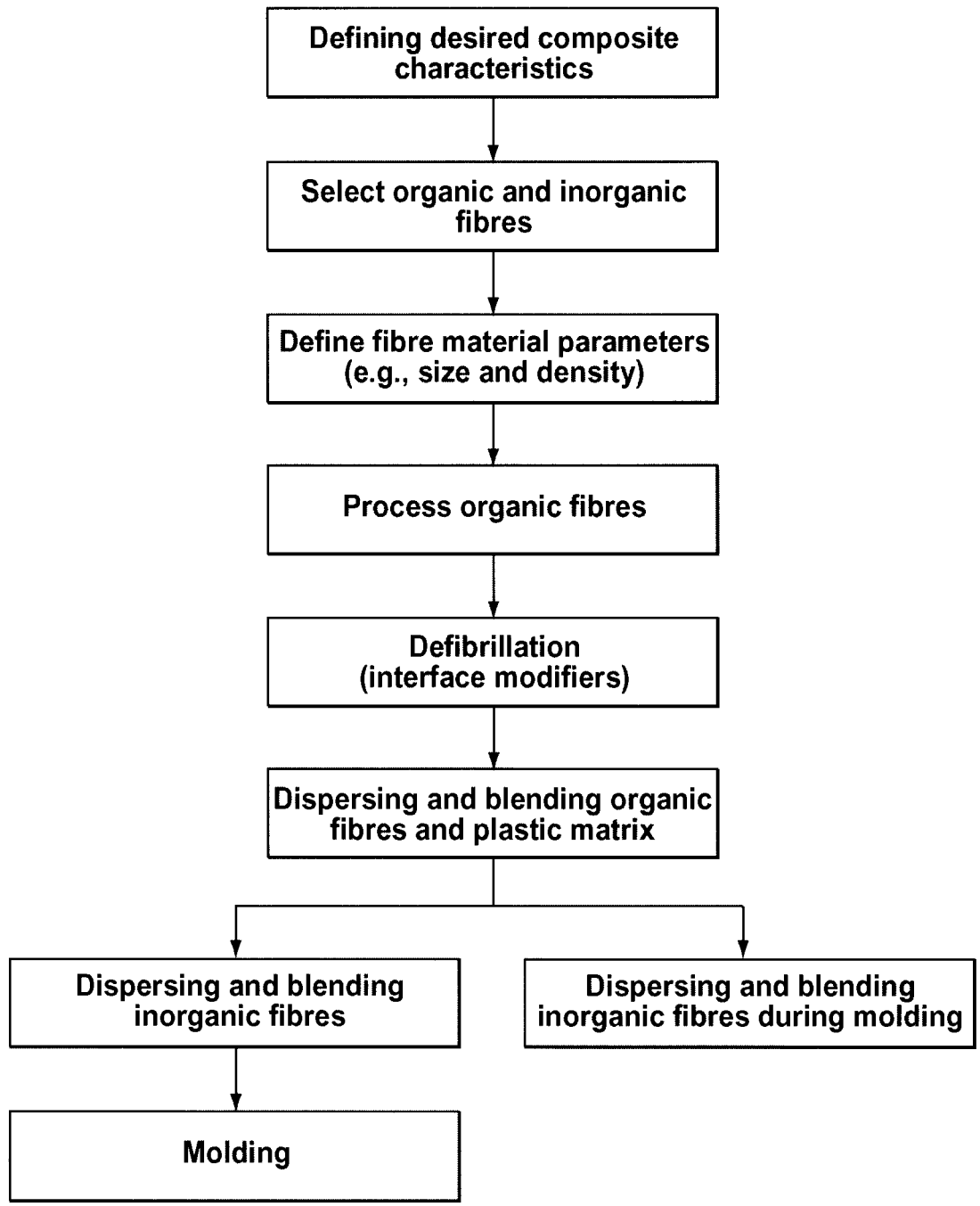
FIG. 8 is a flow chart illustrating process steps in accordance with the present invention.
Figure 9:
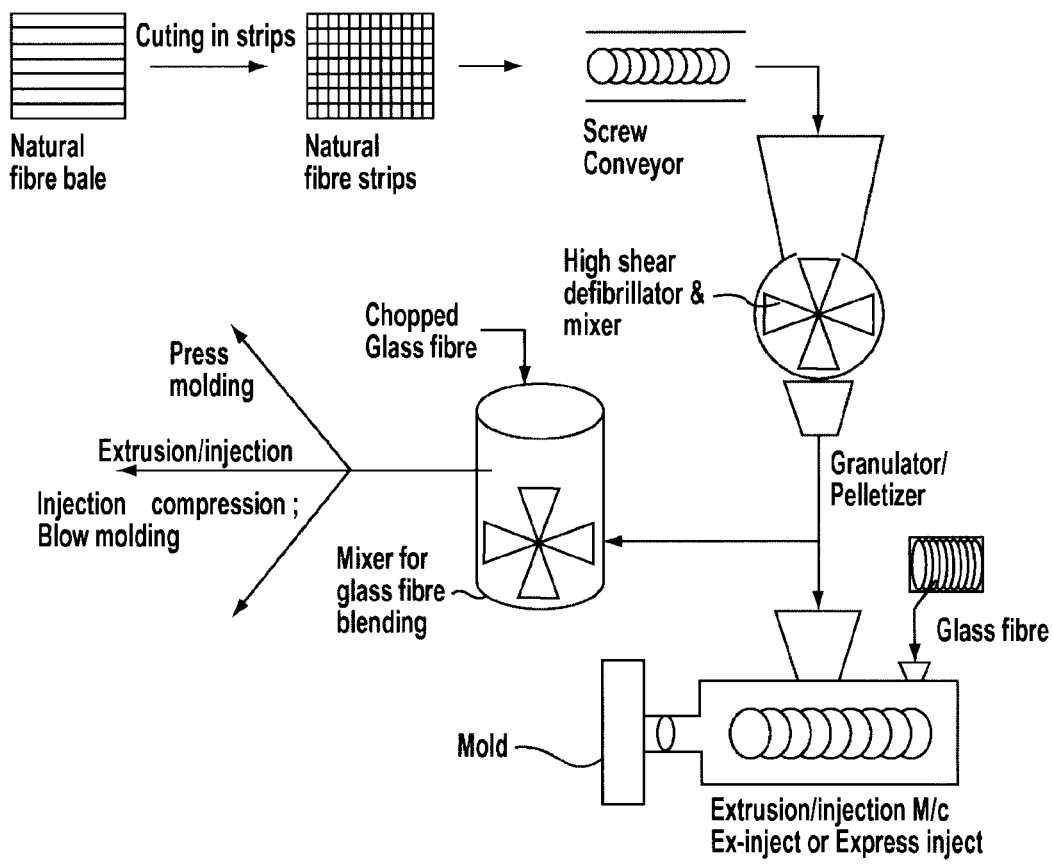
FIG. 9 illustrates a flow diagram of a process in accordance with the present invention.

The processes discussed above are illustrated in the flow chart FIG. 8, and as a flow diagram in FIG. 9.

EXAMPLES

The following examples illustrate some of the moldable thermoplastic compositions and composite products comprising lignocellulosic fibres and the methods of making the same within the scope of the present invention. These are illustrative examples only and changes and modifications can be made with respect to the invention by one of ordinary skill in the art without departing from the scope of the invention.

For the purposes of comparison, the performance properties of polypropylene are shown in Table 1.

TABLE 1

Properties of polyolefin.

| ASTM Test | Performance property | Sample D |
|---|---|---|
| ASTM D638 | Tensile strength, MPa | 31.6 |
| ASTM D638 | Tensile Modulus, GPa | 1.21 |
| ASTM D790 | Flexural Strength, MPa | 50 |
| ASTM D790 | Flexural Modulus, GPa | 1.41 |

Example 1

Examples of the composition of the moldable thermoplastic composition are given in Table 2. In multi-stage processing, pulp fibres were defibrillated in a low shear internal mixer (for example, a HENSCHEL™ mixer) with surface active agents at a temperature of not more than 140° C. and at rpm of at least 90 for not less than 30 minutes followed by defibrillation in a high shear mixer for not less than 30 seconds and melt blended with thermoplastic in the same mixer at temperature not more than 190 degrees Celsius. The melt composition from the high shear mixer was further mixed and blended with glass fibres in a low shear mixer at a temperature of at least 170° C. and at rpm of not less than 80 for not less than 60 seconds. The melt composition from the internal mixer was granulated to prepare the lignocellulosic hybrid composite granulates. With this multi-stage processing technique, both cellulosic and glass fibres were well dispersed in the polymer matrix with good interfacial bonding while maintaining the critical fibre length which may be desirable.

In two-stage processing, pulp fibres were defibrillated in a high shear internal mixer for not more than sixty seconds and melt blended with thermoplastic and surface active agents in the same mixer at a temperature not more than 190 degrees Celsius. The melt composition from the high shear mixer further mixed and blended with glass fibres in a low shear mixer at a temperature of at least 170° C. and at rpm of not less than 80 for not less than 60 seconds. The melt composition from the internal mixer was granulated to prepare the lignocellulosic hybrid composite granulates.

The process described can be practiced using available mixing equipment such as the high shear mixers sold under the brands DRAIS GELIMAT® and PALLTRUDER®, or other mixers that can be used for can be used for fibre and plastic melt mixing at high shear rate. Such mixers may be modified to carry out the melt-mixing, defibrillation and dispersion as described herein in the mixer by providing higher residence time of the fibre and/or the fibre-plastic composition inside the high shear mixing chamber and controlling the frictional heat generation in the mixing chamber in a variety of possible ways known to those skilled in the art (e.g., mechanical alteration of the rotor in the mixing chamber or cooling).

TABLE 2

Composition of the hybrid composites.

| Materials (wt %) | Sample A | Sample B | Sample C | Sample C |
|---|---|---|---|---|
| Polypropylene | 40 | 40 | 40 | 40 |
| Bleached kraft pulp | 35 | — | — | — |
| Thermo-mechanical pulp | — | 35 | — | — |
| Unbleached kraft pulp | — | — | 35 | — |
| Chemithermomechanical pulp | — | — | — | 35 |
| Glass fibre | 15 | 15 | 15 | 15 |
| Maleated polypropylene | 10 | 10 | 10 | 10 |

Performance properties of the lignocellulosic hybrid composites (samples A, B, and C) are summarized in Table 3. The composite samples exhibit a tensile strength of 93, 90, 91, and 95 MPa and a flexural strength of 143, 142, 144 and 155 MPa, respectively. Tensile stiffness of the said composites are 4.6, 4.7, 4.1, and 5.0 Gpa and flexural stiffness of the said composites are 5.6, 6.1, 6.2, and 6.5 GPa, respectively. These composite products provide sufficient properties for applications requiring high strength and stiffness.

TABLE 3

Properties of hybrid composites.

| ASTM Test | Performance Property | Sample A | B | C | D |
|---|---|---|---|---|---|
| ASTM D638 | Tensile strength, MPa | 93 | 90 | 91 | 95 |
| ASTM D638 | Tensile modulus, GPa | 4.6 | 4.7 | 4.1 | 5.0 |
| ASTM D790 | Flexural strength, MPa | 143 | 142 | 144 | 155 |
| ASTM D790 | Flexural modulus, GPa | 5.6 | 6.1 | 6.2 | 6.5 |
| ASTM D256 | Notched Izod impact strength, J/M | 87 | 70 | 78 | 72 |
| ASTM D256 | Un-notched Izod impact strength, J/M | 421 | 312 | 399 | 405 |

Example 2

Effect of fibre type on the mechanical properties of the composites prepared in the present invention under the same defibrillation time is different for composites with different fibres, which indicates the extent of defibrillation which may be desirable for different types of fibres are different, which in turn depends on the fibre characteristics such as method of preparation of the fibres, for example, mechanical pulp or chemically treated pulp, or bleached pulp, etc. Fibres that are prepared by chemical pulping and contain less lignin, are easy to defibrillate and give high mechanical performance compared to the fibres prepared by mechanical means. The following Table (Table 4) shows further examples of the performance properties of the composites with same amount of glass fibre and functional modifiers prepared as per the present invention using a constant defibrillation time. Soft wood pulp requires more defibrillation time than the other pulp fibres, as these fibres are rich in hydrophilic cellulose and long and makes it difficult to defibrillate and disperse in the matrix.

TABLE 4

Effect of fibre type on the mechanical properties of hybrid composites.

| | | Sample | | |
|---|---|---|---|---|
| ASTM Test | Performance Property | TMP | BCTMP (hard wood) | BCTMP (soft wood) |
| ASTM D638 | Tensile strength, MPa | 90 | 95 | 79.2 |
| ASTM D638 | Tensile modulus, GPa | 4.7 | 5.0 | 4.8 |
| ASTM D790 | Flexural strength, MPa | 142 | 155 | 139 |
| ASTM D790 | Flexural modulus, GPa | 6.1 | 6.5 | 5.6 |
| ASTM D256 | Un-notched Izod impact strength, J/M | 312 | 405 | 302 |

Example 3

Effect of glass fibre loading on the mechanical properties of the composites prepared in the present invention under the same defibrillation time and processing conditions is shown in the Table 4, which indicates that extent of hybridization can vary depending upon the property requirements.

TABLE 5

Effect of glass fibre content on the mechanical properties of hybrid composites.

| | | Sample | |
|---|---|---|---|
| ASTM Test | Performance Property | 40% BCTMP (hardwood) + 10% GF | 35% BCTMP (hardwood) + 15% GF |
| ASTM D638 | Tensile strength, MPa | 85 | 95 |
| ASTM D638 | Tensile modulus, GPa | 4.6 | 5.0 |
| ASTM D790 | Flexural strength, MPa | 137 | 155 |
| ASTM D790 | Flexural modulus, GPa | 5.7 | 6.5 |
| ASTM D256 | Un-notched Izod impact strength, J/M | 329 | 405 |

Example 4

Functional polymers are used to improve the interfacial interaction between the fibres and the polymer matrix. Effect of the content of functional modifiers on the mechanical performance of the composites with the same content of fibre and processing conditions are given below (Table 6).

TABLE 6

Effect of interfacial modifiers content on the mechanical properties of hybrid composites.

| | | Sample | | | |
|---|---|---|---|---|---|
| ASTM Test | Performance Property | 40% BCTMP + 10% GF + 5% functional additives | 40% BCTMP + 10% GF + 10% functional additives | 35% BCTMP + 15% GF + 5% functional additives | 35% BCTMP + 15% GF + 10% functional additives |
| ASTM D638 | Tensile strength, MPa | 83.5 | 85 | 90 | 95 |
| ASTM D638 | Tensile modulus, GPa | 4.6 | 4.6 | 4.9 | 5.0 |
| ASTM D790 | Flexural strength, MPa | 134 | 137 | 145 | 155 |
| ASTM D790 | Flexural modulus, GPa | 5.7 | 5.7 | 6.1 | 6.5 |
| ASTM D256 | Un-notched Izod impact strength, J/M | 321 | 329 | 413 | 405 |

Example 5

Performance of organic fibre/glass fibre hybrid thermoplastic composites depends on the process by which the glass fibre mixed with the organic fibre thermoplastic composite pellets or granulates. The effect of blending process on the fibre length and performance properties of the hybrid composites with the same composition is demonstrated in the Table 7.

TABLE 7

Effect of processing conditions (glass fibre blending with organic fibre composite pellets) on the mechanical properties of hybrid composites.

| ASTM Test | Performance Property | Sample | | |
|---|---|---|---|---|
| | | Physical mixing and blending during injection molding | Blending in extruder prior to injection molding | Blending in low shear mixer prior to injection molding |
| ASTM D638 | Tensile strength, MPa | 68.8 | 69.4 | 82.2 |
| ASTM D638 | Tensile modulus, GPa | 4.6 | 4.5 | 4.5 |
| ASTM D790 | Flexural strength, MPa | 119 | 115 | 134 |
| ASTM D790 | Flexural modulus, GPa | 5.5 | 5.4 | 5.8 |
| ASTM D256 | Notched Izod impact strength, J/M | 62 | 32 | 51 |
| ASTM D256 | Un-notched Izod impact strength, J/M | 321 | 329 | 355 |

Example 6

Effect of glass fibre content on the mechanical performance of thermomechanical pulp filled thermoplastic composites with the same processing additives is shown in the Table 8.

TABLE 8

Effect of glass fibre content on the mechanical properties of thermomechanical fibre-glass fibre hybrid composites.

| ASTM Test | Performance Property | Sample | | |
|---|---|---|---|---|
| | | 40% TMP + 10% GF + 5% functional additives | 30% TMP + 10% GF + 5% functional additives | 35% TMP + 5% GF + 5% functional additives |
| ASTM D638 | Tensile strength, MPa | 77 | 71 | 62.7 |
| ASTM D638 | Tensile modulus, GPa | 4.0 | 3.9 | 3.5 |
| ASTM D790 | Flexural strength, MPa | 126 | 116 | 101 |
| ASTM D790 | Flexural modulus, GPa | 5.5 | 4.4 | 3.9 |
| ASTM D256 | Notched Izod impact strength, J/M | 48 | 46 | 34 |
| ASTM D256 | Un-notched Izod impact strength, J/M | 268 | 309 | 250 |

Example 7

Figure 10:
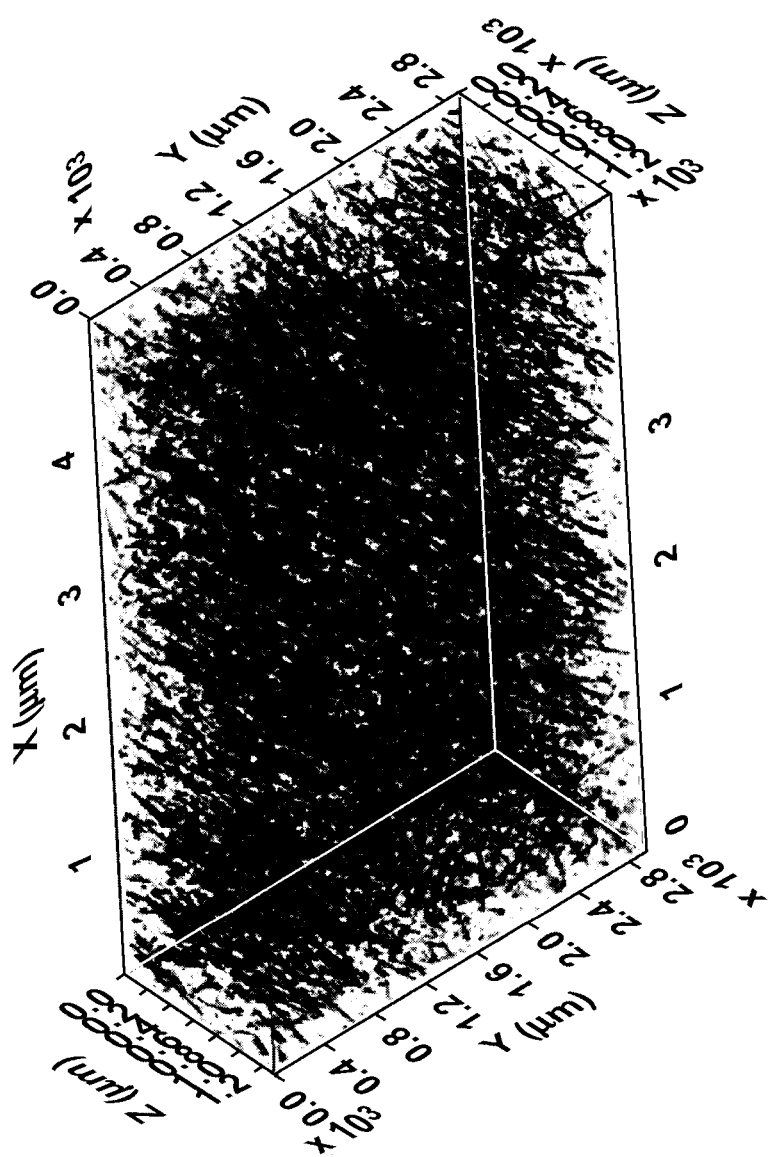
FIG. 10 illustrates a 3D-microtomograph of extrudes strips ready for further injection.

In accordance with one aspect of the invention, glass fibre is fed continuously into a conventional extruder. FIG. 10 is a 3D-microtomograph of extrudes strips for further injection. FIG. 10 shows that the glass fibres are long and continuous and they are well dispersed. Although the Figure limits the image to about 1.4 mm, it has been found that the glass fibres are individualized and have average length greater than 20 mm. This enables maximizing dispersion of inorganic fibre and retaining the fibre length, which may be desirable for better mechanical properties while ensuring that the shear and time does not produce extensive inorganic fibre breakage.

Example 8

In another aspect of the present invention, low shear dispersion of continuous glass fibre staples is presented in a molten defibrillated wood pulp dispersed PP.

In this example we have demonstrated that a premixing step of long glass fibre and defibrillated wood fibre dispersed plastics can be avoided by directly feeding the glass fibre at the feeding hopper of the injection machine.

It should be understood that the present invention may be applied using a conventional injection machine in line with a conventional compounder, for example, wherein the compounder disperses defibrillated wood pulp into the plastic matrix and then the long glass is dispersed in-situ in the injection machine before it arrives the injection port for molded parts manufacturing.

We have demonstrated that a properly designed screw with relatively high length to diameter ratio and low shear may disperse long glass fibre without significant fibre breakage.

Figure 11:
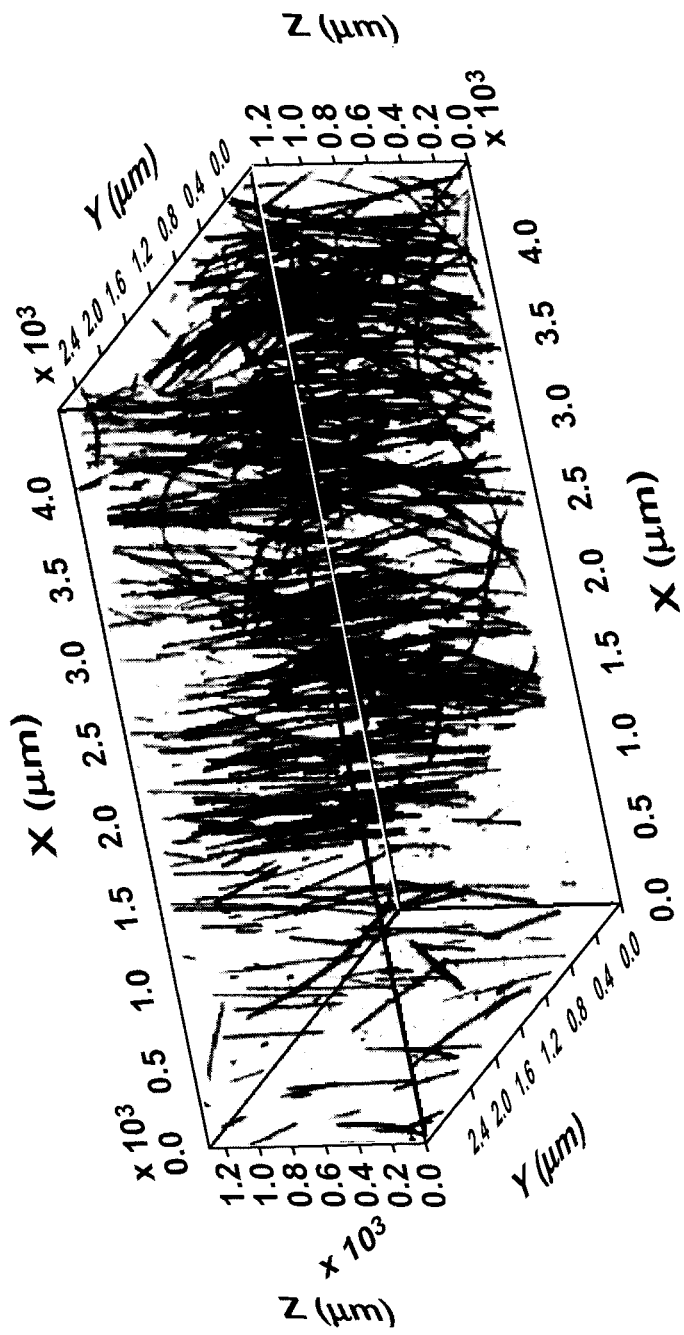
FIG. 11 illustrates the glass fibre dispersion and length after molded into a part through injection of continuous glass in-situ during meting of defribrillated wood pulp dispersed PP.

FIG. 11 shows the glass fibre dispersion and length after molded into a part through injection of continuous glass in-situ during meting of defibrillated wood pulp dispersed PP. Please note that fibres are all continuous and having length more than 4 cm (limited by the image).

What is claimed is:

1. A method of producing a lignocellulosic and inorganic fiber hybrid thermoplastic composite, characterized in that the method comprises:
   (a) defibrillating lignocellulosic fibers in a high shear thermo kinetic mixer in the presence of a surface active agent at a temperature less than the decomposition temperature of the lignocellulosic fibers, during a defibrillation duration that is operable to:
  (i) achieve separation of the lignocellulosic fibers;
  (ii) develop microfibers on the surface of the lignocellulosic fibers,
  (iii) coat the lignocellulosic fibers, with the surface active agent;
(b) dispersing and blending the lignocellulosic fibers obtained in (a) with a melted thermoplastic for a first dispersion duration, thereby forming a first melt composition in situ in the same high shear thermo kinetic mixer; and
(c) dispersing inorganic fibers with the first melt composition using a low shear mixer at a temperature less than the decomposition temperature of the lignocellulosic fibers for a second dispersion duration that is operable to: (i) achieve the dispersion and blending of the inorganic fibers in the first melt composition, thereby forming a second melt composition; (ii) substantially maintain the fiber lengths of the inorganic fibers during the second dispersion duration; and (iii) achieve interfacial adhesion of the thermoplastic with the lignocellulosic fibers and inorganic fibers in the second melt composition.

2. The method of claim 1 characterized in that the lignocellulosic fibers comprise up to 40% by weight of a final melt composition.

3. The method of claim 1 characterized in that the lignocellulosic fibres are essentially wood pulp.

4. The method of claim 3 characterized in that the wood pulp is hardwood pulp, softwood pulp or argo fibre-pulp, and manufactured by mechanical refining, chemical pulping or any combination thereof.

5. The method of claim 1 characterized in that the thermoplastic comprises up to 75% by weight of the second melt composition.

6. The method of claim 1 characterized in that the thermoplastic is selected from the group consisting of polyethylene, polypropylene, polystyrene, polyethylene copolymer, polypropylene copolymer, polyvinyl chloride, polylactic acid, polyphenylene terephthalate, or polyhydroxybutyrate, or any combination thereof.

7. The method of claim 1 characterized in that the inorganic fibres are essentially glass, carbon, aramid or boron.

8. The method of claim 1 characterized in that the inorganic fibres have an average length not less than 0.3 mm.

9. The method of claim 1 characterized in that the defibrillation duration is not more than 60 seconds.

10. The method of claim 1 characterized in that the first dispersion duration is not less than 10 seconds 11. The method of claim 1 characterized in that the second dispersion duration is not less than 60 seconds.

12. The method of claim 1 characterized in that the surface active agent comprises one or more functional polymers.

13. The method of claim 12 characterized in that the functional polymer is selected from the group consisting of maleated polyethylene, maleated polypropylene, copolymers or terpolymers of polypropylene containing acrylate and maleate, maleic anhydride grafted polystyrene, polylactide, polyhydroxybutyrate, or polyphenylene terephthalate.

14. A method of producing a molded lignocellulosic and inorganic fibre hybrid thermoplastic composite product, characterized in that the method comprises:
(a) defibrillation lignocellulosic fibres in a high shear thermokinetic mixer in the presence of a surface active agent to achieve separation of the lignocellulosic fibres and development of microfibers on the surface of the lignocellulosic fibres;
(b) dispersing and blending the lignocellulosic fibres obtained in (a) with a thermoplastic and surface active agents by melt blending to produce a first melt composition in situ in the same high shear thermo kinetic mixer;
(c) dispersing and blending inorganic fibres with the first melt composition by mixing in a low shear mixer to produce a hybrid composite; and
(d) directly injecting the hybrid composite in accordance with an in situ injection, compression or compression-injection molding process.

15. The method of claim 14 characterized in that the dispersing and blending of inorganic fibres and the molding are achieved substantially continuously.

16. The method of claim 1 achieving the lignocellulosic and inorganic fibre hybrid thermoplastic composite having material characteristics including: tensile strength of not less than 85 MPa; and flexual strength of not less than 14 MPa.

* * * * *